United States Patent [19]

Wallace, Jr.

[11] Patent Number: 4,527,388
[45] Date of Patent: Jul. 9, 1985

[54] JET PROPULSION APPARATUS AND METHODS

[75] Inventor: Frank B. Wallace, Jr., Fairfield, Ohio

[73] Assignee: The Garrett Corporation, Los Angeles, Calif.

[21] Appl. No.: 397,728

[22] Filed: Jul. 12, 1982

[51] Int. Cl.³ ............... F02K 1/08; F02K 1/09; F02K 1/38
[52] U.S. Cl. ............... 60/204; 60/271; 60/262; 239/265.19; 239/265.33
[58] Field of Search ........... 60/271, 262, 263, 226.1, 60/204, 224, 244; 239/265.19, 265.25, 265.27, 265.29, 265.33

[56] References Cited

U.S. PATENT DOCUMENTS

| | | |
|---|---|---|
| 2,570,629 | 10/1951 | Anxionnaz et al. . |
| 2,828,603 | 4/1958 | Laucher .................... 60/271 X |
| 2,928,235 | 3/1960 | Johnson . |
| 3,048,973 | 8/1962 | Benedict ............... 239/265.17 X |
| 3,060,679 | 10/1962 | Schmitt .......................... 60/271 |
| 3,068,644 | 12/1962 | Worsham et al. . |
| 3,111,005 | 11/1963 | Howell et al. ............. 60/263 X |
| 3,192,712 | 7/1965 | Nash et al. .................. 60/244 |
| 3,261,164 | 7/1966 | Tumicki . |
| 3,377,804 | 4/1968 | Wright et al. ............... 60/262 |
| 3,447,325 | 6/1969 | Tiley . |
| 3,659,422 | 5/1972 | Hope ........................... 60/224 |
| 3,670,964 | 6/1972 | Pedersen . |
| 3,814,325 | 6/1974 | McCardle, Jr. et al. ....... 60/271 |
| 3,841,091 | 10/1974 | Sargisson et al. . |
| 4,085,583 | 4/1978 | Klees ........................... 60/262 |
| 4,254,619 | 3/1981 | Griffin, III et al. ......... 60/226.1 |

Primary Examiner—Carlton R. Croyle
Assistant Examiner—Jeffrey A. Simenauer
Attorney, Agent, or Firm—Terry L. Miller; Albert J. Miller

[57] ABSTRACT

A turbofan engine having a variable geometry exhaust nozzle.

30 Claims, 2 Drawing Figures

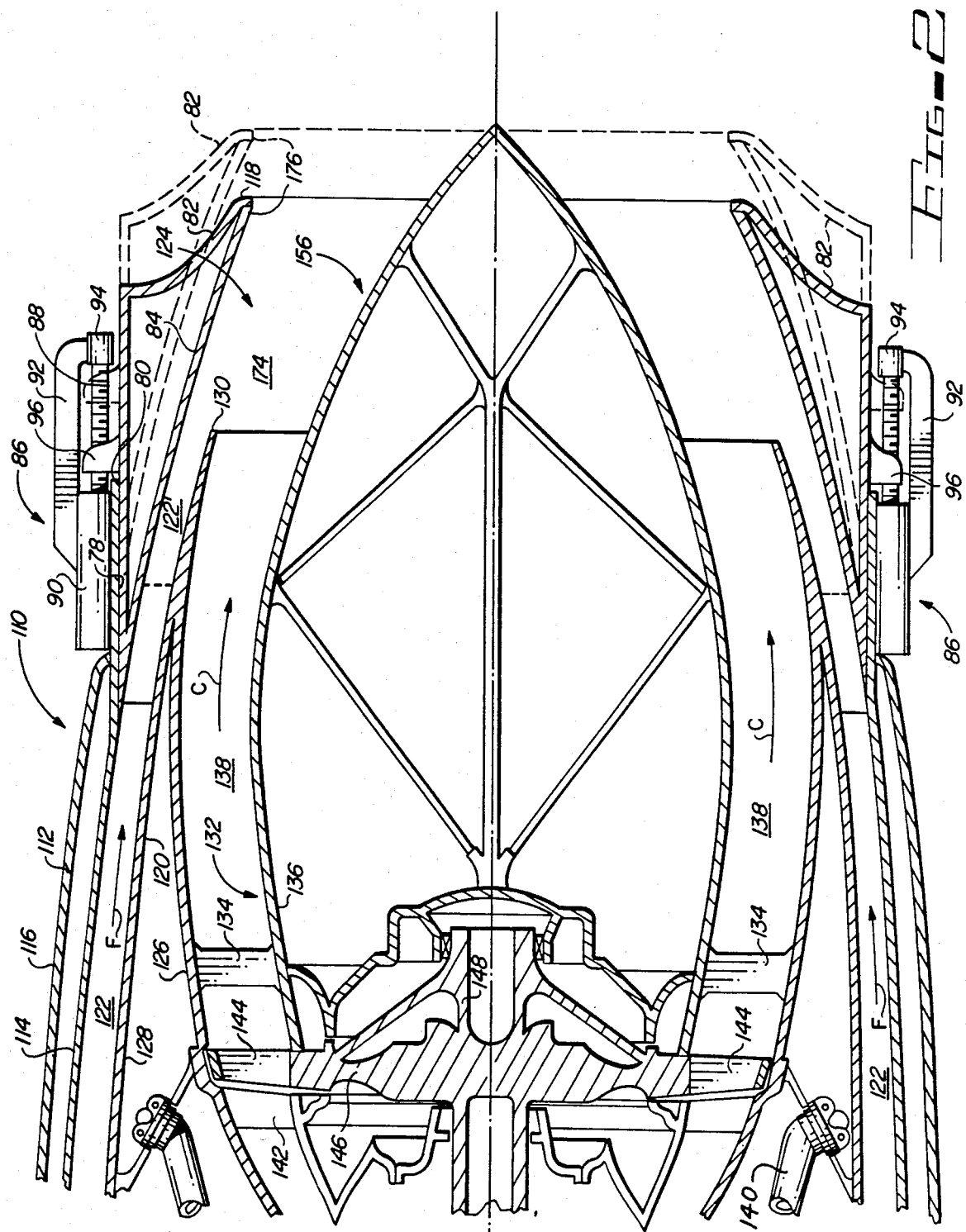

JET PROPULSION APPARATUS AND METHODS

BACKGROUND OF THE INVENTION

The field of this invention is jet propulsion apparatus and methods. More particularly, this invention relates to jet propulsion apparatus of the turbofan type, and associated methods.

Modern aircraft are called upon to fulfill a wide variety of so-called mission requirements. Such mission requirements involve aspects of aircraft use such as short or normal runway takeoff; climb to cruise altitude under best-economy, noise-restricted, or maximum climb-rate conditions; economy cruise, and high speed cruise. In the case of military aircraft such mission requirements may also include aircraft loiter, high speed dash, and combat power settings at a variety of altitudes and with aircraft maneuvering required at both low and high Mach numbers with reliable engine operation despite rapid throttle manipulation; and with relatively low engine fuel consumption rates under all conditions.

Because of the wide variety of aircraft mission requirements, it is desirable to utilize a turbofan type of engine in order to secure the lowest possible engine fuel consumption rates. However, a turbofan engine has both a core engine exhaust duct and a fan bypass duct which each require a particular variation in discharge area and pressure ratio at the engine exhaust nozzle under varying engine operating conditions. Such a variation of discharge areas and pressure ratios is necessary in order to provide an appropriate bypass ratio for the engine under varying conditions to obtain best engine operating efficiency and reliability.

In view of the complex exhaust nozzle requirements of a turbofan engine under varying mission requirements, conventional turbofan engines have utilized a variety of complex nozzle schemes including multiple annular arrays of circumferentially overlapping leaves cooperating to define fan bypass, core engine exhaust, and nozzle throat areas which are variable by radial movement of the leaves. Other conventional nozzle schemes employ one or more arrays of movable leaves in conjunction with an axially translatable cowl section or plug member cooperating with the leaves to define variable fluid flow areas. All such conventional nozzles known to the applicant are structurally complex and require coordinate movement of a multiplicity of their components parts in order to achieve the objective for which they are provided. The structural complexity of such conventional turbofan exhaust nozzles causes them to be prone to wear, jamming and other failures. Further, such exhaust nozzle complexity requires equally complex nozzle actuation systems. Similarly, complex control systems are required to sense engine and aircraft operating paramaters and to control the nozzle actuator systems accordingly. All in all, designers of conventional turbofan engines with variable exhaust nozzles have responded to the complex exhaust nozzle requirements of the turbofan type engine with costly, failure-prone and structurally complex exhaust nozzle structures and methods.

U.S. Pat. Nos. 2,570,629; 2,928,235; 3,068,644; 3,261,164; 3,447,325; 3,670,964; and 3,841,091, illustrate subject matter believed by the applicant to be relevant to the subject invention.

SUMMARY OF THE INVENTION

The present invention provides turbofan jet propulsion apparatus and methods wherein a core engine and a fan bypass passage both discharge streams of pressurized fluid into an exhaust nozzle defining respective fluid flow areas for the receipt of each fluid stream. The exhaust nozzle of the engine combines the streams of pressurized fluid and defines an exhaust opening or throat through which the combined fluid is accelerated to discharge to the atmosphere as a high velocity jet. The exhaust nozzle includes a single axially movable adjusting portion moving relative to the remainder of the exhaust nozzle to simultaneously vary both the throat area and one of the respective fluid flow areas through which the core engine and fan bypass passage fluid streams flow.

Accordingly, the invention provides a turbofan engine with a structurally simple and reliable exhaust nozzle defining both a variable throat area and a variable area for one of the core engine exhaust flow and fan bypass passage air flow. Consequently, the bypass ratio of the engine is variable in response to movement of the single nozzle adjusting portion. One preferred embodiment of the invention includes an axially movable center body or plug member cooperating with a pair of coannular radially inner and radially outer walls circumscribing the plug member to define a radially outer annular fan bypass passage of fixed area and a radially inner annular core engine exhaust passage whose area is varied in response to axial movement of the plug member. Both the fan bypass passage and core engine exhaust passage discharge into a mixing region of the exhaust nozzle. The plug member cooperates with the radially outer wall to define the mixing region of the exhaust nozzle. The mixing region leads to an annular throat of the exhaust nozzle which is variable in response to axial movement of the plug member.

An alternative preferred embodiment of the invention includes an immovable plug member cooperating with an immovable radially inner annular wall to define an annular core engine exhaust passage of fixed area. In this embodiment of the invention a radially outer coannular wall comprises an axially movable portion cooperates with the radially inner wall to define an annular fan bypass passage whose area is varied in response to axial movement of the adjusting portion. The movable adjusting portion also cooperates with the plug member to define an annular exhaust throat of the nozzle whose area is variable in response to axial movement of the adjusting portion.

BRIEF DESCRIPTION OF THE DRAWINGS

FIG. 2 is similar to FIG. 1 and depicts a turbofan engine having an exhaust nozzle according to an alternative embodiment of the invention.

DETAILED DESCRIPTION OF THE PREFERRED EMBODIMENTS

Figure 1:
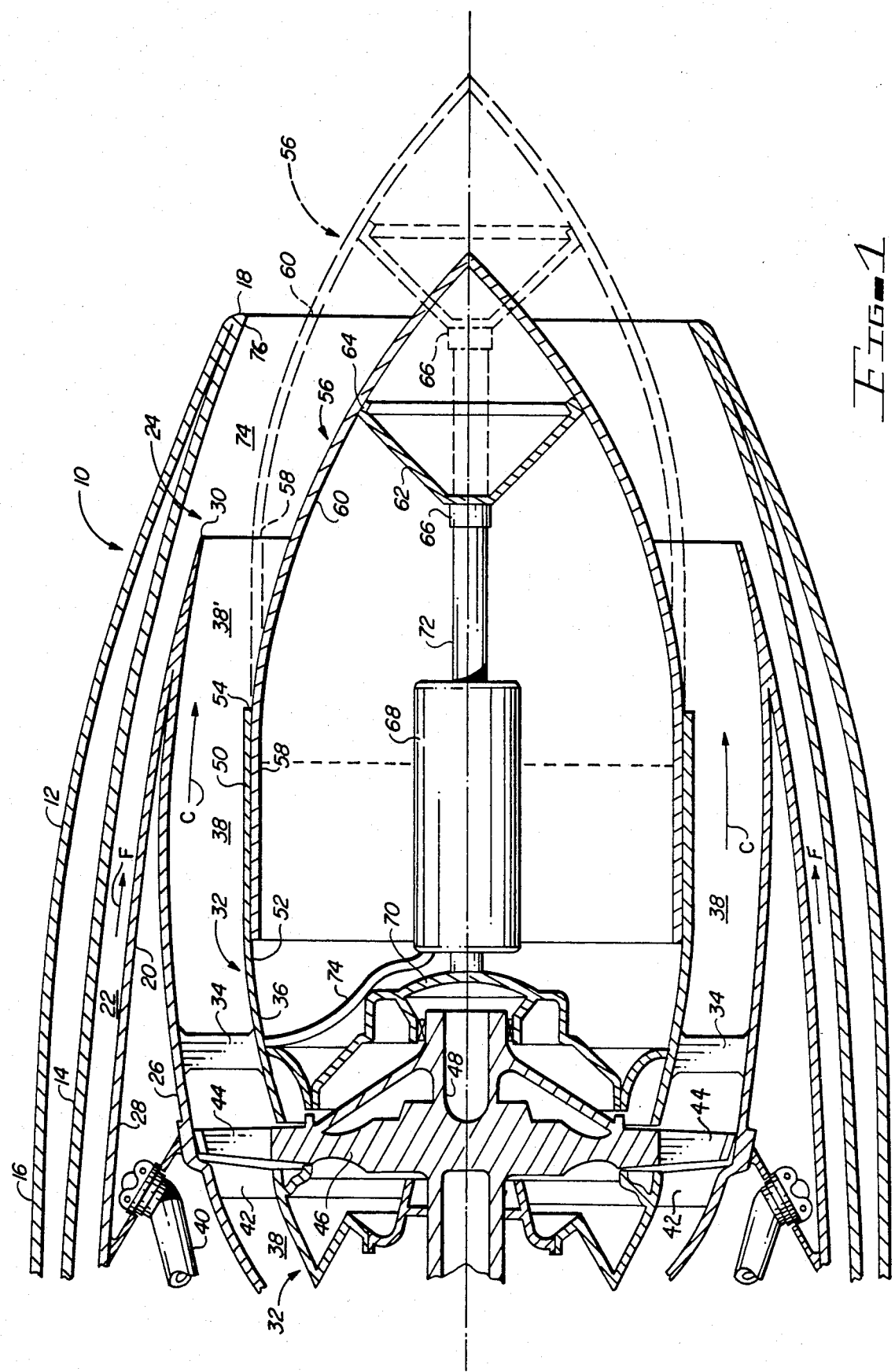
FIG. 1 depicts a longitudinal view, which is partially in cross section and somewhat schematic, of the aft end of a turbofan engine having an exhaust nozzle embodying the invention.

FIG. 1 depicts a turbofan engine 10 (only the aft end of which is illustrated) having a housing 12. The housing 12 comprises a spaced apart coannular pair of radially inner and radially outer relatively thin metallic walls 14 and 16 which converge and are secured together at 18 to define an exhaust end of the engine 10. A radially inner annular wall 20, which is coannular with the wall 14, cooperates with the latter to define an annular fan bypass passage 22. The fan passage 22 leads from a conventional fan portion (not illustrated) of the engine 10. Passage 22 communicates pressurized air (representated by arrows F) from the fan portion of engine 10 to the exhaust nozzle portion thereof, which is generally referenced by numeral 24. The wall 20 is itself double walled and includes a spaced apart coannular pair of radially inner and radially outer walls 26 and 28 which converge and are secured together at 30 to define an aft end or terminus of the fan passage 22. With respect to the passage 22 the wall 14 may be considered a radially outer wall. Similarly, the wall 28, while an outer wall with respect to wall 26, is a radially inner wall with respect to passage 22.

A center body generally referenced with numeral 32 is concentrically supported within the engine 10 and annular wall 20 thereof by a multitude of struts 34 (only two of which are illustrated) extending radially between center body 32 and wall 20. The center body 32 includes a radially outer annular wall 36 cooperating with the wall 26 to define an annular core engine exhaust passage 38. The engine 10 includes a combustor (not shown) receiving fuel via a fuel manifold 40 (only a portion of which is illustrated) to maintain combustion producing a flow of hot, pressurized core engine exhaust gases. The core engine exhaust gases flow from the combustor via passage 38, between a multitude of radially extending stator vanes 42 (only two of which are illustrated), and between a radially extending multitude of turbine blades 44 (only two of which are illustrated). The turbine blades 44 are carried upon a turbine wheel portion 46 of a rotor 48 journaled by center body 32. Rotor 48 is rotatably driven by the core engine exhaust gases and in turn rotatably drives the fan portion and other portions of the engine 10.

A portion 50 of the wall 36 defines a generally cylindrical recess 52 opening in the downstream direction (rightwardly, viewing FIG. 1) at a downstream end edge 54 of wall portion 50. The center body 32 includes a hollow plug member portion 56 which is slidably received in recess 52. Plug member 56 includes a generally cylindrical wall section 58 matched to and slidably engaging wall portion 50 and a converging somewhat parabolic or arcuate downstream wall section 60. That is, the portion 56 is telescopically associated with the remainder of the center body 32, as portion 56 is slidably received in recess 52. Downstream of the end edge 54 of wall portion 50, the sections 58 and 60 of plug member 56 cooperate with wall 26 to define a portion 38' of passage 38. The passage portion 38' defines a core engine exhaust gas entry passage for the exhaust nozzle 24 and terminates at 30 substantially coextensively with passage 22. Further inspection of FIG. 1 will reveal that the passage portion 38' is divergent or increasing in area in the downstream direction because confronting portions of wall 26 and of wall sections 58 and 60 converge at different rates. The section 60 converges at a greater rate than does the confronting portion of wall 26 while only an insignificantly small portion of cylindrical wall section 58 is exposed in a first position of the plug member 56, as is illustrated by solid lines viewing FIG. 1.

Within the plug member 56, a conical structural member 62 is secured thereto at 64 and centrally carries a socket member 66. An extensible actuator 68 is carried by a section 70 of the center body 32. The actuator 68 includes an axially movable rod portion 72 which terminates in a end portion (not visible viewing FIG. 1) which is secured within socket member 66 for axial motion in unison therewith while allowing limited angular motion therebetween. A control conduit 74 extends from a conventional power source (not illustrated) to actuator 68 to control extension and contraction of the latter.

Pressurized core engine exhaust gases flowing in passage 38 (represented by arrows C) and pressurized air F flowing in passage 22 enter an annular mixing region 74 downstream of the terminus 30 of passages 22 and 38. The mixing region 74 is defined by the cooperation of wall 14 and wall section 60 of plug member 56. The mixing region 74 leads to an exhaust nozzle throat 76 defined by the cooperation of wall 14 coextensively with the terminus 18 thereof and the wall section 60 of the plug member 56. It will be observed that with the plug member 56 in a first position, illustrated by solid lines viewing FIG. 1, the mixing section 74 and throat section 76 are divergent in area in the downstream direction because the confronting portions of wall 14 and section 60 converge at different rates with the section 60 defining the greater rate of convergence.

In the first position of plug member 56, the fan bypass passage 22 and the divergent portion 38' of passage 38 both discharge pressurized fluid into the annular divergent mixing region 74. Mixing region 74 in turn leads to divergent nozzle throat 76 which discharges the pressurized mixed fluids to the atmosphere. At the terminus 30, the walls 14 and 28 cooperate to define a first annular fan bypass fluid flow area. Also at terminus 30, the walls 26 and 60 cooperate to define a second annular fluid flow area for the flow of core engine exhaust gases C. The ratio of the first area to the second area described supra influences the fan bypass ratio of the engine 10 to define a predetermined value for the latter. Thus, in the first position of the plug member 56, the engine 10 is adapted for fuel-efficient cruise or so-called "break point" operation with the plug member 56 cooperating with wall 14 to define an appropriate annular third area at throat 76 for the engine economy-cruise condition.

For high-power operation of the engine 10, as for takeoff, high-speed cruise or military combat power setting, the actuator 68 is axially extensible to translate the plug member 56 aft to a second position illustrated by dashed lines in FIG. 1. In the second position of the plug member 56, the first fluid flow area defined for passage 22 at terminus 30 remains unchanged. However, the cylindrical wall section 58 confronts the wall 26 at the terminus 30 to define a fourth annular fluid flow area for the flow of core engine exhaust gases C. The ratio of the first area to the fourth area described above influences the fan bypass ratio of the engine 10 to increase the latter. In other words, when the plug member 56 is translated from its first position aft to its second position, the fan bypass ratio of the engine 10 is increased from the first predetermined valve to a certain higher valve. Further, as the plug member 56 translates rightwardly viewing FIG. 1, increasingly larger diameter portions of wall section 60 are brought into confronting relationship with the wall 14 at nozzle throat 76. Consequently, the fluid flow area at nozzle throat 76 is decreased in accordance with the requirements of engine 10 at the increased fan bypass ratio and power setting. The plug member 56 is also translatable forwardly for reduced power operation of the engine 10.

Additional study of FIG. 1 will reveal that as the plug member 56 is translated aft from its first position to its second position, the divergence of passage portion 38' and of mixing region 74 and nozzle throat 76 is decreased. In fact, when the plug member 56 is in its second position, the passage portion 38' is convergent upstream of terminus 30 while the mixing region 74 and nozzle throat 76 are also slightly convergent. By an appropriate selection and matching of the convergence rates of walls 14, 26 and 60, the magnitudes and rates of change from divergence toward convergence of passage portion 38', mixing region 74, and throat 76 in response to translation of plug member 56 are matched to the requirements of the engine 10 under various operating conditions thereof.

FIG. 2 illustrates a turbofan engine according to an alternative embodiment of the invention. Features of the embodiment illustrated in FIG. 2 which are analogous in structure or function to features of the embodiment illustrated by FIG. 1 are referenced with the same numeral used supra and increased by 100.

Viewing FIG. 2, the engine 110 includes a housing 112 having a pair of spaced apart coannular walls 114 and 116. An inner coannular wall 120 includes a radially outer annular wall 128 cooperating with wall 114 to define an annular fan bypass passage 122. The passage 122 communicates a flow of pressurized air F from a fan portion of the engine 110 to an exhaust nozzle portion 124 thereof. Wall 114 also defines a cylindrical bore 78 opening in the downstream direction at an end edge 80 of the wall 114. An annular member 82 is slidably received in the bore 78. Member 80 includes a radially inner annular wall 84 which is curvilinear to converge in the downstream direction. The wall 84 cooperates with wall 128 to define a downstream portion 122' of passage 122. The wall 84 terminates at a downstream edge 118 to define an exhaust nozzle throat 176 for the engine 10.

A center body 132 is concentrically supported within wall 120 by a multitude of struts 134 extending therebetween. An outer wall 136 of center body 132 cooperates with an inner wall 126 to define an annular core engine exhaust passage 138. The wall 136 extends rearwardly (rightwardly viewing FIG. 2) to define an immovable plug member 156. Wall 120 ends at a terminus 130 so that the passages 122 and 138 also end substantially coextensively with terminus 130. Downstream of the terminus 130, walls 84 and 136 cooperate to define an annular mixing region receiving the air flow F and a core engine exhaust flow C from passages 122 and 138, respectively. the mixing region 174 leads to the exhaust nozzle throat 176.

A multitude of actuators 86 (only two of which are illustrated) are carried upon the wall 114 upstream of the end edge 80 thereof. Each of the actuators 86 includes an elongate axially extending jack screw 88 which is rotatable by a motor portion 90 of the actuator. A bridge portion 92 supports a bearing member 94 which in turn supports and journals the distal end of the jack screw 88 remote from motor portion 90. Respective radially extending portions 96 of the member 82 threadably engage each jack screw 88. The actuators 86 are operable in unison to rotate the jack screws 88 and axially translate the member 82.

In a first position of the member 82, as is illustrated in solid lines viewing FIG. 2, the walls 126 and 136 cooperate to define a first fixed annular fluid flow area for the core engine exhaust gases C at terminus 130. Similarly, the walls 128 and 84 cooperate to define a second annular fluid flow area at terminus 130 for the flow of pressurized air F. Consequently, the ratio of the second area to the first area defined immediately above influences the bypass ratio of engine 110 to accommodate the latter for one of high-power or economy-cruise operation. Additionally, the wall 84 cooperates with wall 136 of plug member 156 to define an appropriate annular exhaust area for the engine 110 at throat 176.

When the member 82 is translated aft by actuators 86 to a second position illustrated by dashed lines in FIG. 2, the first fluid flow area defined above for core engine exhaust flow is unchanged. However, the wall 84 cooperates with wall 128 in the second position of member 82 to define a third annular fluid flow area for the fan bypass flow F at terminus 130. Consequently, the bypass ratio of engine 110 is increased to adapt the latter for the other of high-power or reduced-power, economy cruise operation. Further, as the member 82 translates aft increasingly smaller diameter portions of the plug member 156 are brought into confronting relationship with wall 84 at throat 176. Consequently, in the second position of member 84, the fluid flow area at throat 176 and the divergence thereof are increased to provide an appropriate exhaust nozzle throat area for the other condition of operation of engine 110.

In light of the above, it is easily appreciated that the engines 10 and 110 illustrated in FIGS. 1 and 2, respectively, may be adapted for a variety of operating conditions at various aircraft altitudes by axially translating plug member 56 or annular member 82, respectively. Further, it is apparent that the embodiments of FIGS. 1 and 2 provide turbofan engine apparatus and methods wherein axial translation of a single member simultaneously varies one of a fan bypass passage area and core engine exhaust passage area along with the area of an exhaust nozzle throat. By combining the embodiments of FIGS. 1 and 2, and providing for coordinate movement of the plug member and annular member, it is possible to provide a turbofan engine having a bypass ratio varying in response to axial coordinate movement of only two members while the nozzle throat area of the engine remains constant. The nozzle throat area and fan bypass ratio of such an engine may be independently varied by providing for independent axial movement of the plug member and annular member.

While the invention has been depicted and described by reference to two preferred embodiments thereof, no limitation upon the invention is implied by such reference and none is to be inferred. The invention is intended to be limited only by the spirit and scope of the appended claims which provide a definition of the invention.

I claim:

1. A turbofan jet engine having a core engine exhaust passage and a fan bypass passage each discharging respective pressurized fluid streams into a single exhaust nozzle portion of said engine via respective first and second fluid flow areas, said exhaust nozzle combining said fluid streams and defining an exhaust nozzle throat through which said combined fluid streams are discharged, said exhaust nozzle including single axially movable means for simultaneously varying both the area of said exhaust nozzle throat and one of said first and second fluid flow areas in response to axial movement of said movable means.

2. The invention of claim 1 wherein said movable means comprises an axially tapering plug member movably carried by a center body of said turbofan jet engine for axial movement relative to the remainder of said engine.

3. The invention of claim 2 wherein said plug member and said center body are telescopically associated for axial relative reciprocation.

4. The invention of claim 2 wherein said engine further includes a radially inner and radially outer coannular pair of walls both circumscribing said center body, said radially inner wall cooperating with said plug member to define said first fluid flow area, said radially outer wall cooperating with said radially inner wall to define said second fluid flow area and also cooperating with said plug member to define said exhaust nozzle throat.

5. The invention of claim 1 or 4 wherein said movable means is axially movable between a first position and a second position, in said first position of said movable means both said core engine exhaust passage and said exhaust nozzle throat being divergent in a downstream direction, axial movement of said movable means toward said second position simultaneously varying the divergence of both said core engine exhaust passage and said exhaust nozzle throat.

6. The invention of claim 5 wherein axial movement of said movable means toward said second position thereof decreases the divergence of both said core engine exhaust passage and of said exhaust nozzle throat.

7. The invention of claim 6 wherein axial movement of said movable means toward said second position decreases the area of both said first fluid flow area and of said exhaust nozzle throat.

8. The invention of claim 1 wherein said movable means comprises on annular member movably carried by said turbofan jet engine for axial movement relative to the remainder of said engine, said annular member defining a radially inner wall converging in a downstream direction and defining a radially outer fluid flow boundary of said exhaust nozzle portion of said engine.

9. The invention of claim 8 wherein a housing of said engine defines an axially extending cylindrical bore, said annular member being movably received in said bore for axial reciprocation relative to said housing.

10. The invention of claim 8 wherein said engine further includes a center body having a relatively immovable plug member portion, a relatively immovable annular wall circumscribing said plug member portion and spaced radially outwardly therefrom and radially inwardly from said annular member, said plug member portion cooperating with said annular wall to define said first fluid flow area, said annular wall cooperating with said annular member to define said second fluid flow area, and said annular member cooperating with said plug member portion to define said exhaust nozzle throat.

11. The invention of claim 1 or 10 wherein said movable means is axially movable between a first position and a second position, in said first position of said movable means said exhaust nozzle throat being divergent in a downstream direction, axial movement of said movable means toward said second position simultaneously varying the divergence of said exhaust nozzle throat and the area of said second fluid flow area.

12. The invention of claim 11 wherein movement of said movable means toward said second position increases both the divergence of said exhaust nozzle throat and the area of said second fluid flow area.

13. The invention of claim 12 wherein movement of said movable means toward said second position increases the area of both of said exhaust nozzle throat and said second fluid flow area.

14. The invention of claim 1 wherein said jet engine includes actuator means for axially moving said movable means.

15. Exhaust nozzle apparatus for a turbofan jet engine or the like, said nozzle apparatus comprising outer nozzle means having an exit opening with an effective discharge area, inner nozzle means having an exit opening with an effective discharge area, said inner nozzle means being coaxially disposed within said outer nozzle means, fan bypass passage means having an exit opening to said outer nozzle means and defining an effective discharge area, and plug means disposed within said inner and outer nozzle means and cooperating therewith to define said effective discharge areas thereof, said nozzle apparatus including single axially movable means for selectively and simultaneously varying said effective discharge area of said outer nozzle means and of one of said inner nozzle means and said fan bypass passage means.

16. The invention of claim 15 wherein said axially movable means comprises said plug means, axial movement of said plug means varying said effective discharge area of said inner nozzle means.

17. The invention of claim 15 wherein said axially movable means comprises an annular member axially movable relative to the remainder of said nozzle apparatus to vary said effective discharge area of said fan bypass passage means.

18. The invention of claim 15 wherein said exhaust nozzle apparatus further includes actuator means for axially moving said axially movable means.

19. Turbofan jet engine apparatus comprising a fan portion discharging a first flow of pressurized air via a fan bypass passage, a core engine portion discharging a second flow of pressurized exhaust gases via a core engine exhaust passage, and an exhaust nozzle portion communicating said first and said second flows, said exhaust nozzle portion comprising first and second plug-type nozzles in fluid flow series communicating said second flow and cooperating to define a mixing region therebetween, each of said first and second plug-type nozzles defining a respective fluid flow area, said fan bypass passage opening to said mixing region to define a third fluid flow area, said exhaust nozzle portion comprising a single axially movable member axial movement of which simultaneously varies two of said first, second, and third fluid flow areas.

20. The invention of claim 19 wherein said exhaust nozzle portion includes a single plug member centrally disposed within each of said first and second plug-type nozzles and defining a portion of each.

21. The invention of claim 20 wherein said axially movable member comprises said plug member.

22. The invention of claim 21 wherein said exhaust nozzle portion includes a radially inner and a radially outer coannular pair of walls both circumscribing said plug member; said radially inner wall cooperating with said plug member to define said core engine exhaust passage, said first plug-type nozzle, and said respective first fluid flow area; said radially outer wall cooperating with said plug member to define said second plug-type nozzle, and said respective second fluid flow area; said radially inner and radially outer walls cooperating to define said fan bypass passage and said third fluid flow area.

23. The invention of claim 20 wherein said axially movable member comprises an annular member circumscribing said plug member and cooperating therewith to define said mixing region, said second plug-type nozzle, and said second fluid flow area thereof.

24. The invention of claim 23 wherein said exhaust nozzle portion includes an annular wall circumscribing said plug member and cooperating therewith to define said core engine exhaust passage, said first plug-type nozzle, and said first fluid flow area thereof.

25. The invention of claim 24 wherein said annular wall cooperates with said annular member to substantially define said fan bypass passage and said third fluid flow area thereof.

26. In a turbofan jet engine having a fan portion supplying pressurized fluid to a nozzle portion via bifurcated flow path means extending therebetween, one portion of said pressurized fluid flowing to said nozzle portion via a core engine portion substantially defining one branch of said bifurcated flow path means, the remaining portion of said pressurized fluid flowing to said nozzle portion via fan bypass passage means substantially defining the other branch of said bifurcated flow path means, said nozzle portion defining an exhaust nozzle throat through which said pressurized fluid is discharged, the ratio of said remaining fluid portion to said one fluid portion establishing a bypass ratio for said engine, the method of simultaneously varying both said bypass ratio and the fluid flow area of said exhaust nozzle throat comprising the steps of providing a single axially movable member axial movement of which adjusts the area of said exhaust nozzle throat, utilizing said member to substantially define a portion of at least one branch of said bifurcated flow path means, and axially moving said member to adjust at least one of said one fluid portion and said remaining fluid portion.

27. The method of claim 26 including utilizing as said single axially movable member one of a plug member and an annular member circumscribing said plug member and cooperating therewith to define said exhaust nozzle throat.

28. A method of efficiently operating a turbofan jet engine at a duality of design point operating conditions, said engine having a first and a second passage each having an effective disharge area and respectively discharging core engine exhaust gas and bypass air streams to an exhaust nozzle portion of said engine, said exhaust nozzle portion defining a throat having an effective discharge area through which said exhaust gas and bypass air streams discharge to atmosphere, said method comprising the steps of:
positioning a member on said engine for selective axial movement between first and second positions in which said member interacts with each of said streams; and
axially moving said member to simultaneously and selectively vary said exhaust nozzle throat discharge area and one of said respective discharge areas of said first and said second passage.

29. The method of claim 28 including utilizing a centrally located plug member as said axially movable member.

30. The method of claim 28 including utilizing as said axially movable member an annular member which circumscribes a plug member.

* * * * *